(No Model.)
A. H. HEISEY.
GLASS WATER TRAY.
No. 294,231. Patented Feb. 26, 1884.
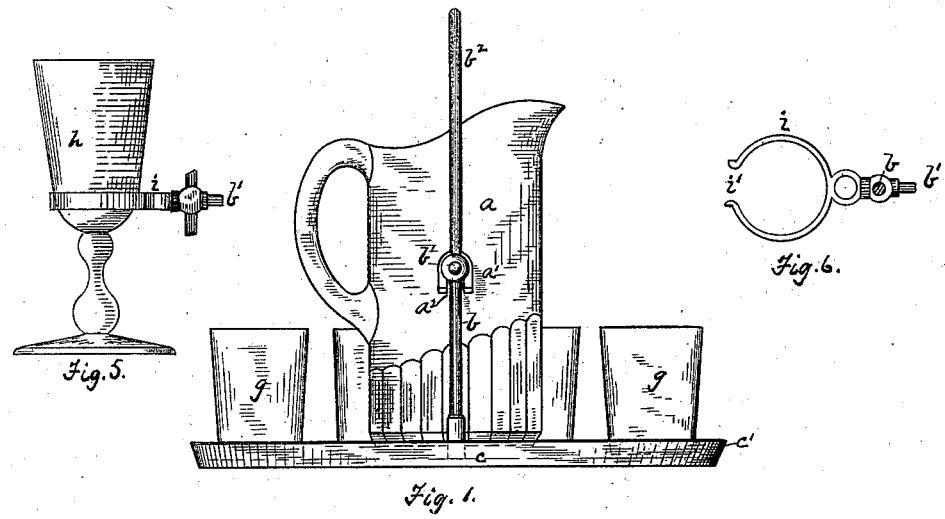
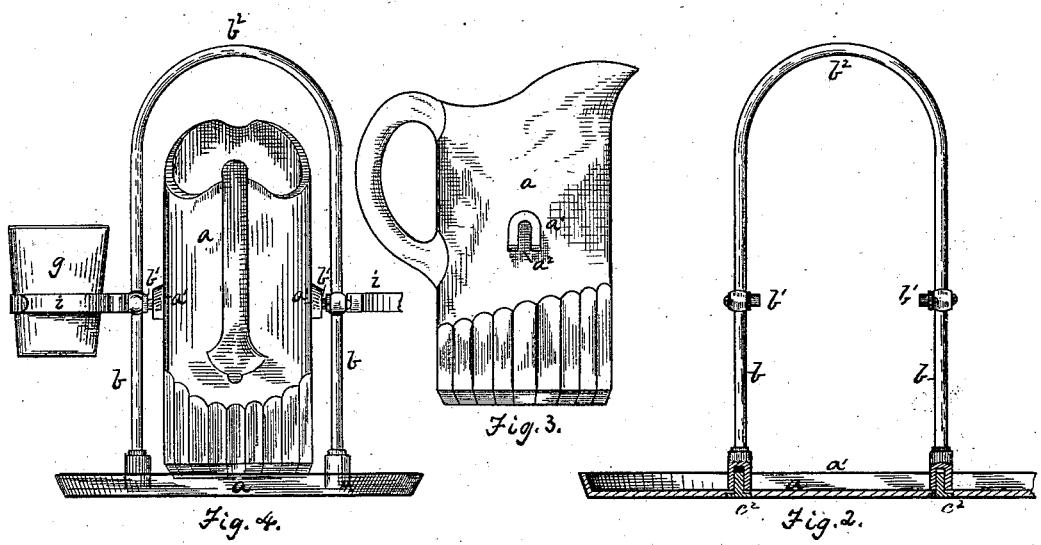
WITNESSES
W. B. Corwin
D. R. Cowl
INVENTOR
Augustus H. Heisey
by his attys
Bakewell & Kerr

UNITED STATES PATENT OFFICE.

AUGUSTUS H. HEISEY, OF IDLEWOOD, PENNSYLVANIA.

GLASS WATER-TRAY.

SPECIFICATION forming part of Letters Patent No. 294,231, dated February 26, 1884.

Application filed December 29, 1883. (No model.)

*To all whom it may concern:*

Be it known that I, AUGUSTUS H. HEISEY, of Idlewood, in the county of Allegheny and State of Pennsylvania, have invented a new and useful Improvement in Glass Water-Trays; and I do hereby declare the following to be a full, clear, and exact description thereof, reference being had to the accompanying drawings, in which—

Figure 1 is a view of my improved water-tray. Fig. 2 is a view of the bail and tray, the latter being in section. Fig. 3 is a view of the pitcher. Fig. 4 is a view of a modification. Figs. 5 and 6 are detail views.

Like letters of reference indicate like parts in each.

I construct a glass pitcher, $a$, by the use of any of the usual methods of making such articles, which pitcher is provided with lugs $a'$, arranged opposite to each other, and having a recess, $a^2$, opening from the bottom upward, to receive the journals or pivots $b'$ of the standards $b$. The tray proper, $c$, is preferably a flat disk, having a flange, $c'$, extending around its upper edge. The metallic standards $b$ are secured to the tray $c$ by means of screws extending through holes $c^2$, formed in the bottom of the tray.

Another suitable means for fastening the standards to the tray may be used—such as a threaded stem on the ends of the standards, and nuts screwed thereon on the under side of the tray, which may be formed with recesses in the bottom to receive the nuts, if desired. Preferably the standards $b$ are connected by a yoke or bail, $b^2$, which constitutes a handle, by which the tray may be raised and carried. The journals $b'$ can be secured to the standards either permanently or removably, as may be desired. The tray $c$ is made wide enough to hold or carry a row of tumblers, $g$, or goblets $h$, as shown in Fig. 1. The pitcher $a$, being provided with the open slots $a^2$, is removable from the standards $b$.

The tray, with its pitcher and tumblers, is shown in Fig. 1, where the adjacent tumblers are omitted for the purpose of showing the pitcher more clearly. When in this position the pitcher can be used by swinging it on its pivots $b'$.

In Figs. 4, 5, and 6, I show how the tray $c$ can be made smaller, so as to constitute simply a base for the structure, and two tumblers or goblets be supported by the standards. This is done by means of a bracket, $i$, which is permanently or removably secured to the standards, preferably forming part of the journal-pieces $b'$, as shown at Fig. 6. Where these brackets are used with tumblers, they may constitute a ring and the tumblers be dropped into them, as shown in Fig. 4. Where they are to be used with goblets, they have an open slot, $i$, Fig. 6, through which the stem of the goblet may be inserted laterally.

My invention constitutes a cheap, convenient, and handsome article of table-ware.

If desired, the lugs may be on the standards and the pivots on the pitcher.

What I claim, and desire to secure by Letters Patent, is—

1. A glass pitcher provided with journal-bearings, in combination with supporting-standards having journals and provided with a suitable base, substantially as and for the purposes described.

2. A glass base or tray of sufficient width to hold a row of tumblers, provided with standards having journals, in combination with a pivoted or swinging pitcher mounted thereon, substantially as and for the purposes described.

3. A glass base or tray having standards for supporting a swinging pitcher, and provided with brackets on the standards, for receiving and supporting goblets and similar articles, substantially as and for the purposes described.

In testimony whereof I have hereunto set my hand this 24th day of December, A. D. 1883.

AUGUSTUS H. HEISEY.

Witnesses:
THOMAS B. KERR,
W. B. CORWIN.